July 24, 1934.  M. NOWICKI ET AL  1,968,002
DISTANCE METER, ESPECIALLY FOR PHOTOGRAPHIC CAMERAS
Filed May 24, 1933
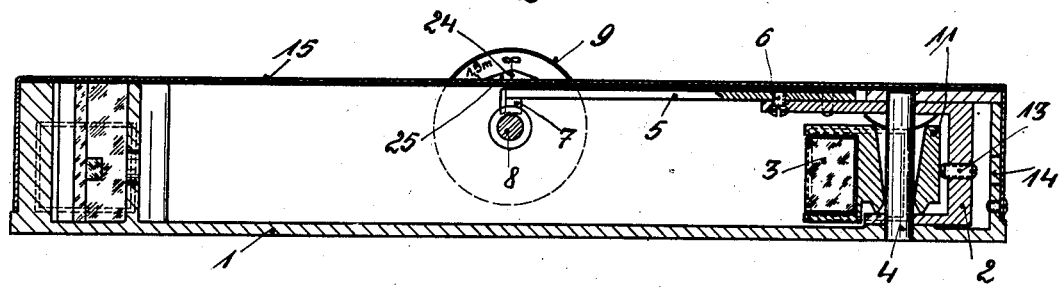
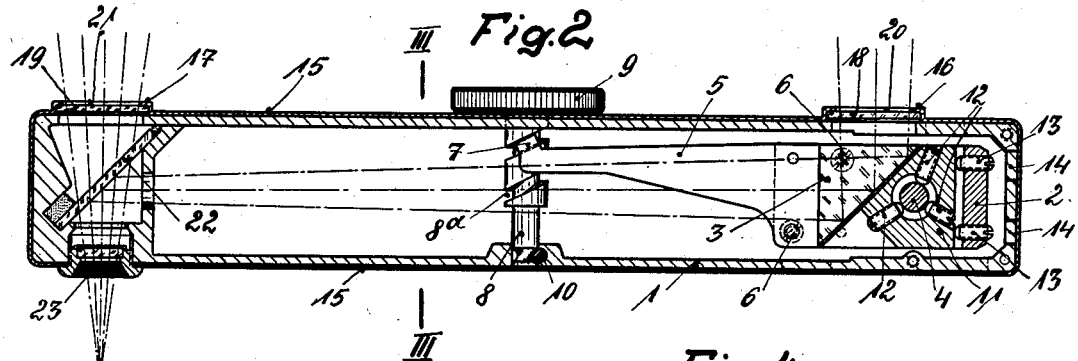
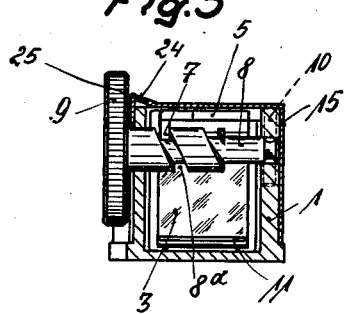
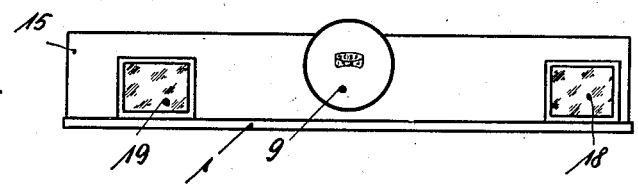
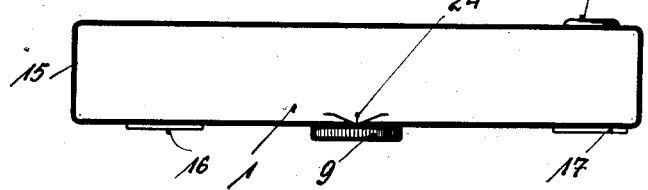
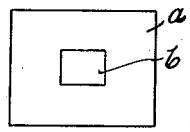
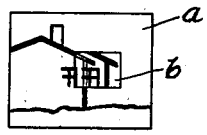
Inventors:
M. Nowicki.
E. Böttger.
By
Attorney.

Patented July 24, 1934

1,968,002

UNITED STATES PATENT OFFICE 1,968,002

DISTANCE METER, ESPECIALLY FOR PHOTOGRAPHIC CAMERAS

Martin Nowicki and Erich Böttger, Dresden, Germany

Application May 24, 1933, Serial No. 672,634
In Germany May 28, 1932

2 Claims. (Cl. 88—2.4)

This invention relates to distance meters of the type in which semi-transparent mirrors are used. The foils making the mirrors semi-transparent for the purpose in view have up to now in most cases been made of silver, sometimes, however, also of platinum. The silver suffers from the detrimental property that it is easily subject to chemical changes. Platinum is, counter thereto, very stable, but its reflection capacity is very slight with respect to spectral ranges.

Apart from these deficiencies, said semi-transparent mirrors do not permit to discern in a noticeable degree differences of color, or of tints respectively, neither when looking through, nor when looking upon, them. It is, however, just what concerns distance meters, very desirable to give the pictures, i.e. the two pictures which are to cover one another, different colors or tints in order to facilitate the manipulation.

This is now rendered possible, according to the present invention, by covering the mirror, in order to make it semi-transparent, with a thin metallic layer which when the operator is looking through this mirror at the object imparts to this latter another color or tint than has the picture of the object appearing upon the mirror by reflection. A particularly suitable metal to form said thin layer is gold which is, besides, distinguished by the property that it is not subject to chemical changes of any kind. It is, of course, possible to employ also any other metal that is suited for the purpose in view. A semi-transparent mirror bearing the thin gold layer mentioned shows a greenish light when being looked through, whereas the reflected picture appears in a reddish light. When the two pictures are placed upon one another, the picture appears more or less in its natural colors.

The invention is illustrated diagrammatically and by way of example on the accompanying drawing on which Figure 1 is a longitudinal section through a distance meter designed according to this invention. Figure 2 is a similar section taken, however, at 90° relatively to Fig. 1. Figure 3 is a transverse section in the plane III—III of Fig. 2 and being seen in the direction from the left to the right in Fig. 1. Figure 4 is a side-view of the distance meter drawn to a reduced scale relatively to Figs. 1-3. Figure 5 is a plan of the distance meter, the scale being the same as in Fig. 4. Figure 6 shows the direct field of sight (greenish color or tint), as well as the field of sight made visible by reflection (reddish color or tint), and Figure 7 shows the two fields laid upon one another, in connection with the object looked at.

On the drawing, 1 denotes the casing of the distance meter and 2 is a holder for the movable mirror or prism 3. The holder 2 is turnable on an axle 4, and can be turned by means of a lever 5 which is connected with it by screws 6. The lever 5 has a lug 7 engaging a helical groove $8^a$ of a spindle 8 which can be turned by means of a knob 9 whereby the mirror will be turned. A pin 10 prevents axial motion of said spindle 8. In order to be able to move the mirror or the prism 3 to all sides for the purpose of adjusting it a mounting member 11 is provided which can be tilted in every direction with respect to the axle 4 by means of three screws 12. Also screws 13 are provided for turning said member 11 in horizontal direction.

For actuating said screws 12 and 13 from the outside there are provided in the casing 1 bores 14 which are covered with a cap 15 surrounding the greatest part of the casing 1. Said cap has also mountings 16 and 17 for glass windows 18 and 19. The pictures are bounded by apertures 20 and 21 provided in the settings 16 and 17. In the casing 1 is a semi-transparent mirror 22 held in a mounting made integral with the casing 1.

23 is the ocular opening. The measured distance can be read at a scale provided at the knob 9. The mark 24 is formed by a nose 25 pressed out of the cap 15.

In Fig. 6 are shown the visible fields of sight, as distinguished by their different colors or tints (indicated by different hatchings). These fields are produced by the semi-transparent mirror 22 and the mirror 3. The surface $a$ which is that with the tint of green shows the tint of the picture seen through the mirror, and the surface $b$ which is that having the tint of red shows the tint of the reflected image.

In Fig. 7 is shown how the object looked at appears to the eye in the ocular. The part cut out of the picture $b$ must be made to coincide with the larger picture $a$ whereafter the distance can be read at the scale.

I claim:

1. A distance meter, especially for photographic cameras, having a mirror made semi-transparent by a layer of a metal giving the picture obtained by looking directly at the object through said mirror another color or tint than has the picture made visible by reflection.

2. A distance meter, especially for photographic cameras, having a mirror made semi-transparent by a layer of gold so as to give the picture obtained by looking directly at the object through said mirror another color or tint than has the picture made visible by reflection.

MARTIN NOWICKI
ERICH BÖTTGER.